United States Patent
Magnaud

(10) Patent No.: US 11,580,052 B2
(45) Date of Patent: Feb. 14, 2023

(54) I2C COMMUNICATION

(71) Applicant: STMicroelectronics (Grand Ouest) SAS, Le Mans (FR)

(72) Inventor: Yves Magnaud, Chateaugiron (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 123 days.

(21) Appl. No.: 17/003,764

(22) Filed: Aug. 26, 2020

(65) Prior Publication Data

US 2021/0064567 A1 Mar. 4, 2021

(30) Foreign Application Priority Data

Aug. 28, 2019 (FR) .................................. FR1909470

(51) Int. Cl.
| | |
|---|---|
| *G06F 13/42* | (2006.01) |
| *G06F 1/04* | (2006.01) |
| *G06F 9/30* | (2018.01) |
| *G06F 9/48* | (2006.01) |
| *G06F 13/24* | (2006.01) |

(52) U.S. Cl.
CPC ............ *G06F 13/4291* (2013.01); *G06F 1/04* (2013.01); *G06F 9/30101* (2013.01); *G06F 9/4825* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 2003/0126253 A1* | 7/2003 | Ewing ...................... | G06F 1/26 709/223 |
| 2009/0024781 A1* | 1/2009 | Heizmann ................. | G06F 1/10 710/305 |
| 2009/0240896 A1* | 9/2009 | Kang .................. | G06F 13/4234 711/149 |
| 2010/0177067 A1* | 7/2010 | Tung ........................ | G09G 5/18 345/204 |
| 2013/0124763 A1* | 5/2013 | Kessler ................. | G06F 13/364 710/110 |
| 2015/0363353 A1* | 12/2015 | Enami ...................... | G06F 1/08 710/110 |
| 2019/0155776 A1* | 5/2019 | Miyama .................. | G06F 13/36 |

FOREIGN PATENT DOCUMENTS

| | | |
|---|---|---|
| CN | 105426338 A | 3/2016 |
| GB | 2537856 A | 11/2016 |

OTHER PUBLICATIONS

UM10204, NXP Semiconductors, Apr. 4, 2014 (Year: 2014).*
UM10204, Apr. 4, 2014, NXP Semiconductors (Year: 2014).*
"I get both rising and falling flags on my CMP0 callback function", Apr., 1, 2015, NXP Community (Year: 2015).*

* cited by examiner

*Primary Examiner* — Hyun Nam
(74) *Attorney, Agent, or Firm* — Slater Matsil, LLP

(57) ABSTRACT

The present disclosure relates to a communication method by I2C bus between a emitting device and a receiving device, in which: a rising edge of a clock signal of the I2C bus, directly following a start condition of an I2C communication, is recorded; and when an interruption is generated within the receiving device, the receiving device verifies whether the rising edge was recorded.

20 Claims, 2 Drawing Sheets

I2C COMMUNICATION

CROSS-REFERENCE TO RELATED APPLICATIONS

This application claims the benefit of French Patent Application No. 1909470, filed on Aug. 28, 2019, which application is hereby incorporated herein by reference.

TECHNICAL FIELD

The present disclosure relates generally to communication, and in particular to I2C communication.

BACKGROUND

A computer bus is a data transmission device between several electronic devices, for example between several components of a same electronic system. A bus generally comprises one or several cables suitable for transmitting different types of signals, for example, address signals, data signals, clock signals, etc. Each data bus is implemented by a communication protocol that defines how the logic data are exchanged between the devices.

Among the different existing communication buses and protocols, the I2C (Inter-Integrated Circuit) technology is a communication technology comprising a two-way serial bus. Several electronic devices, sending or receiving, can be connected to this bus. A bus configured for the I2C technology uses two data transmission cables.

It would be desirable to be able to improve, at least partially, the known communication techniques using a bus configured for I2C communication.

SUMMARY

The present disclosure relates generally to electronic devices and systems. More specifically, the present description relates to communication methods between electronic devices and/or systems.

Embodiments of the present application provide more reliable communication techniques, and provide reliable communication techniques using a bus configured for I2C communication.

One embodiment addresses all or some of the drawbacks of the known communication techniques using a bus configured for I2C communication.

One embodiment provides a communication method by I2C bus between a emitting device and a receiving device, in which: a rising edge of a clock signal of the I2C bus, directly following a start condition of an I2C communication, is recorded; and when an interruption is generated within the receiving device, the receiving device verifies whether the rising edge was recorded when it is interrupted.

According to one embodiment, the start condition is a falling edge of the data signal during a high state of the clock signal.

According to one embodiment, an interruption is generated within the receiving device when it receives a software interruption that is sent to each start condition of an I2C communication.

According to one embodiment, if the receiving device detects that the rising edge has not been recorded, then it reads the data of the data signal.

According to one embodiment, if the receiving device detects that the rising edge has been recorded, then it waits for a stop condition of the I2C communication.

According to one embodiment, the stop condition is a rising edge of the data signal during a high state of the clock signal.

According to one embodiment, the rising edge is stored in a register.

According to one embodiment, the register is a register belonging to general input/output registers of a system.

According to one embodiment, the emitting device and the receiving device belong to the system.

According to one embodiment, the system is a microprocessor.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The signals mentioned in the present description are analog signals comprising a high state and a low state respectively corresponding to logic data "1" and "0". Unless otherwise stated, the high state represents a high voltage level, for example, equal to a supply voltage. Unless otherwise stated, the low state represents a low voltage level, for example, equal to a reference voltage, for example the ground.

In the remainder of the description, I2C communication refers to a communication between two electronic devices linked by a bus configured for the I2C technology, hereinafter denoted I2C bus.

Figure 1:
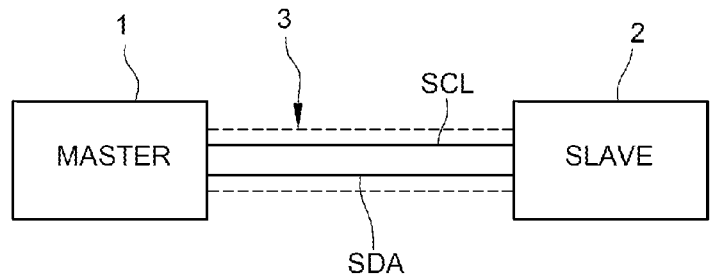
FIG. 1 shows, schematically and in block diagram form, an I2C communication.

FIG. 1 shows, schematically and in block diagram form, an I2C communication between two electronic devices 1 and 2.

The device 1 (MASTER) is the emitting device, or master device, in the I2C communication, and the device 2 (SLAVE) is the receiving device, or slave device, in the I2C communication. The emitting device is that which sends commands, for example data read or write commands, to the receiving device. The devices 1 and 2 are, for example, components of a same circuit, or two electronic circuits of a same electronic system.

The two devices are linked by an I2C bus 3, symbolized in dotted lines in FIG. 1. The bus 3 comprises two cables transmitting signals SCL and SDA. The signal SCL is, during a communication I2C, a clock signal whose clock frequency is imposed by the emitting device 1. The signal SDA is, during an I2C communication, a two-way data signal, that is to say, a signal transmitting data coming indifferently from the device 1 or the device 2.

According to a variant, an I2C bus can link more than two devices. As an example, an I2C bus can link several slave devices to one master device, or several master devices to one slave device, or several slave devices to several master devices.

Figure 2:
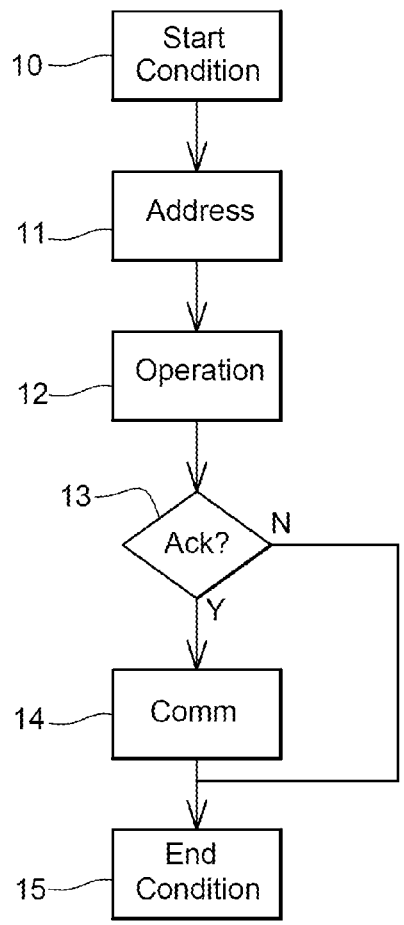
FIG. 2 shows a flowchart illustrating steps of an I2C communication of FIG. 1.

FIG. 2 shows a flowchart illustrating steps of an I2C communication between the devices 1 and 2 described in relation with FIG. 1.

Before the I2C communication between the devices 1 and 2 begins, the signals SCL and SDA are not used and are kept at a high level, for example by pull-up resistances, not shown in FIG. 2.

In an initial step 10 (Start Condition), the I2C communication between the devices 1 and 2 begins. To that end, the emitting device 1 sends a start condition. A start condition for an I2C communication is defined, for example, by a falling edge of the signal SDA while the signal SCL is at a high level.

The start condition imposed by the emitting device 1 generates a software interruption in the receiving device 2. This interruption results in notifying the receiving device 2 that an I2C communication is beginning. In other words, the interruption results in "waking up" the device 2.

Once the start condition has passed, the device 1 sends a clock signal via the signal SCL. Thus, the signal SCL has, after the start condition, a first falling edge and goes to a low level. The duration d (shown in FIG. 3) between the start condition and the first falling edge of the signal SCL depends on the device 1 and an I2C communication mode used. There are several I2C communication modes, each corresponding to a different clock frequency. As an example, in a standard mode, the clock frequency is for example in the order of 100 kHz, in a fast mode, the clock frequency is for example in the order of 400 kHz, and in a fast mode+, the clock frequency is in the order of 1000 kHz. The duration d is for example in the order of 600 ns in a fast mode. The duration d generally being very short, verifying the implementation of a start condition can be difficult.

In a step 11 (Address), the emitting device 1 sends the address of the receiving device with which it wishes to communicate via the signal SDA. As an example, the device 1 sends an address datum encoded on 7 bits. To read this datum, the receiving device 2 reads a datum of the signal SDA at each rising edge of the signal SCL.

In a step 12 (Operation), the emitting device 1 sends a datum indicating the operation that it will be asked to perform to the receiving device whose address was sent in step 11. As an example, the device 1 sends a datum comprising 1 bit via the signal SDA. As an example, the operations that the device 1 can request are the reading and the writing of data.

In a step 13 (Ack?), if the address sent by the device 1 in step 11 corresponds to the address of the device 2, then the device 2 sends an acknowledgment datum to the device 1 (output Y). The following step is a step 14 (Comm). Otherwise (output N), the device does not send acknowledgment data, and the communication stops, the following step is a step 15 (end condition). An acknowledgment datum sent by the device 2 is for example a placement in the low state of the signal SDA.

In step 14, the devices 1 and 2 communicate, for example by exchanging commands and data.

In step 15, the devices 1 and 2 have finished exchanging data and commands, and the emitting device 1 sends a stop condition. A stop condition for an I2C communication is defined, for example, by a rising edge of the signal SDA while the signal SCL is at a high level. The I2C communication between the devices 1 and 2 is then completed.

Figure 3:
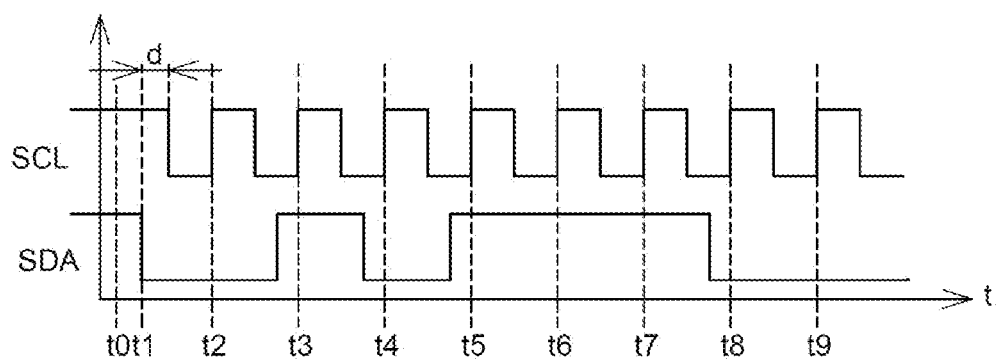
FIG. 3 shows timing diagrams of signals of the I2C communication of FIG. 1.

FIG. 3 shows timing diagrams for the signals SCL and SDA during an example I2C communication start between the devices 1 and 2.

At an initial moment t0, the signals SCL and SDA are at a high level.

At a moment t1, the device 1 sends a start condition, and the signal SDA goes to a low state. An interruption is generated within the receiving device 2. The duration d is shown in FIG. 3.

At a moment t2, the signal SCL has a first rising edge. The device 2 begins to read the address sent by the emitting device 1. The following data are read at moments t2, t3, t4, t5, t6, t7 and t8, each corresponding to a rising edge of the signal SCL. In the example of FIG. 3, the binary data sent by the device 1, via the signal SDA, is "0101110," this datum being an address. This address is followed by the bit designating the operation to be performed, which, in the case of FIG. 1, is a "0", which for example designates a writing operation.

In certain cases, the receiving device 2 may not react quickly to the intervention sent by the start condition of the emitting device 1. As an example, the device 2 can be in standby mode or in a mode where it cannot be interrupted, or it can be in the process of executing operation that cannot be interrupted. When the receiving device 2 reacts late to the start condition, it may miss the first falling and rising edges of the signal SCL, and thus only read part of the data sent by the emitting device 1, and in particular part of the address. An embodiment described in relation with FIG. 4 makes it possible to address this drawback.

Figure 4:
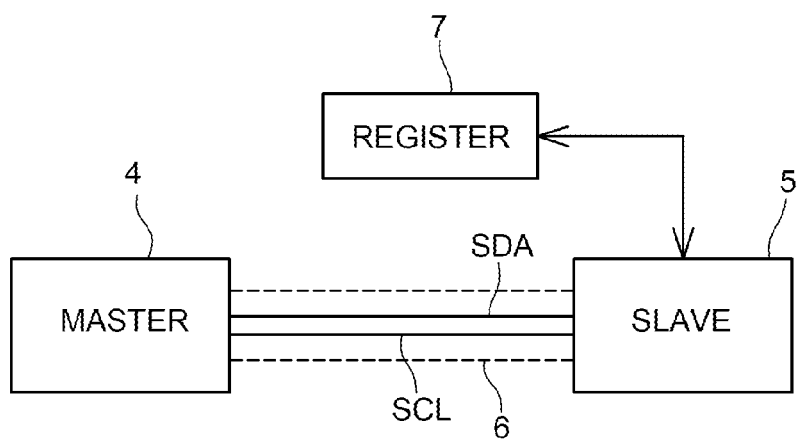
FIG. 4 shows, schematically and in block diagram form, an embodiment of an I2C communication.

FIG. 4 shows, schematically and in block diagram form, an embodiment of an I2C communication between two electronic devices 4 and 5.

The device 4 (MASTER) is the emitting device, or master device, in the I2C communication, and the device 5 (SLAVE) is the receiving device, or slave device, in the I2C communication. The devices 4 and 5 are, for example, components of a same circuit, or two electronic circuits of a same electronic system.

The two devices 4 and 5 are linked by an I2C bus 6, symbolized by dotted lines in FIG. 4. The bus 6 is identical to the bus 3 described in relation with FIG. 1, and therefore comprises two cables transmitting the signals SCL and SDA.

The receiving device 5 is further configured to read data written in a register 7 (REGISTER). The register 7 is configured to detect and record the first rising edge of the signal SCL according to a start condition of the I2C communication.

According to one embodiment, the register 7 is outside the devices 4 and 5. The register 7 can for example be part of an electronic system to which the devices 4 and 5 also belong. The register 7 can for example be part of the general purpose input/output (GPIO) registers of a microprocessor.

An I2C communication between the devices 4 and 5 works in a similar manner to that described in relation with FIGS. 2 and 3, with the difference that each time the receiving device 5 receives an interruption, it verifies the state of the register 7 in order to determine whether the first rising edge, after the start condition, of the signal SCL has already taken place.

One advantage of this embodiment is that each time the receiving device 5 receives an interruption coming from a start condition of an I2C communication, it can verify whether the first rising edge of the signal SCL has already taken place. If it has not yet taken place, this means that the device 5 has raised the alert in time and has not missed a bit. If it has taken place, this means that the device 5 has raised the alert too late, in which case it must wait for a stop condition of the I2C communication. The receiving device 5 does not monitor the data transmitted by the data signal SDA anymore, as it has been raised the alert too late it might have lost part of the transmitted data, or it might enter in a communication which is not intended for it.

The embodiment described in relation with FIG. 4 has another advantage. In some cases, several receiving devices can be linked to one emitting device by means of an I2C bus. An error can occur when one of the receiving devices reacts late to the start condition and takes a series of bits for its address. In this case, it can interfere in a communication that does not concern it, which can cause malfunctions. With the embodiment described in FIG. 4, the receiving device reacting late is aware of its delay, and cannot mistake a series of bits for its address.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A communication method by an Inter-Integrated Circuit (I2C) bus between an emitting device and a receiving device, the method comprising:
    recording a rising edge of a clock signal of the I2C bus directly following a start condition of an I2C communication; and
    determining, by the receiving device, whether the rising edge was recorded in response to an interruption being generated within the receiving device.

2. The method according to claim 1, wherein the start condition is a falling edge of a data signal during a high state of the clock signal.

3. The method according to claim 1, wherein an interruption is generated within the receiving device in response to receiving a software interruption that is sent at each start condition of the I2C communication.

4. The method according to claim 1, wherein in response to determining that the rising edge has not been recorded, reading data of a data signal.

5. The method according to claim 1, wherein in response to determining that the rising edge has been recorded, waiting for a stop condition of the I2C communication.

6. The method according to claim 5, wherein the stop condition is a rising edge of a data signal during a high state of the clock signal.

7. The method according to claim 1, wherein the rising edge is stored in a register.

8. The method according to claim 7, wherein the register is a register belonging to general input/output registers of a system.

9. The method according to claim 8, wherein the emitting device and the receiving device belong to a system.

10. The method according to claim 9, wherein the system is a microprocessor.

11. A communication method by an Inter-Integrated Circuit (I2C) bus between an emitting device and a receiving device, the method comprising:
    generating an interrupt following a detection of a falling edge of a data signal of an I2C communication over the I2C bus;
    determining, based on a value stored in a register, whether an event indicative of a rising edge of a clock signal on the I2C bus has occurred; and
    in response to determining that the event indicative of the rising edge of the clock signal has not occurred, reading data of the data signal.

12. The method according to claim 11, further comprising:
    storing a detection of the rising edge of the clock signal on the I2C bus directly following a start condition of an I2C communication, wherein the start condition is a falling edge of the data signal during a high state of the clock signal.

13. The method according to claim 11, wherein the interrupt is generated within the receiving device in response to receiving a software interruption that is sent to each start condition of an I2C communication.

14. The method according to claim 11, wherein in response to determining that the event indicative of the rising edge of the clock signal has occurred, waiting for a stop condition of the I2C communication.

15. The method according to claim 14, wherein the stop condition is a rising edge of the data signal during a high state of the clock signal.

16. The method according to claim 11, wherein the register is a register belonging to general input/output registers of a system, wherein the emitting device and the receiving device belong to a system, and wherein the system is a microprocessor.

17. An electronic component comprising:
    a receiving device coupled to an emitting device through an Inter-Integrated Circuit (I2C) bus;
    a register storing a value indicative of an occurrence of a rising edge of a clock signal on the I2C bus;
    a processor; and
    a memory storing a program to be executed in the processor, the program comprising instructions to cause the processor to:
        generate an interrupt following a detection of a falling edge of a data signal of an I2C communication over the I2C bus;

determine, based on the value stored in the register, whether an event indicative of the rising edge of the clock signal on the I2C bus has occurred; and in response to determining that the event indicative of the rising edge of the clock signal has not occurred, read data of the data signal.

18. The electronic component of claim 17, wherein in response to determining that the event indicative of the rising edge of the clock signal has occurred, waiting for a stop condition of the I2C communication.

19. The electronic component of claim 18, wherein the stop condition is a rising edge of the data signal during a high state of the clock signal.

20. The electronic component of claim 17, wherein the register is a hardware register belonging to general input/output registers of a system comprising the emitting device and the receiving device.

\* \* \* \* \*